H. MIGUES.
VALVE.
APPLICATION FILED NOV. 12, 1919.
1,371,638.
Patented Mar. 15, 1921.
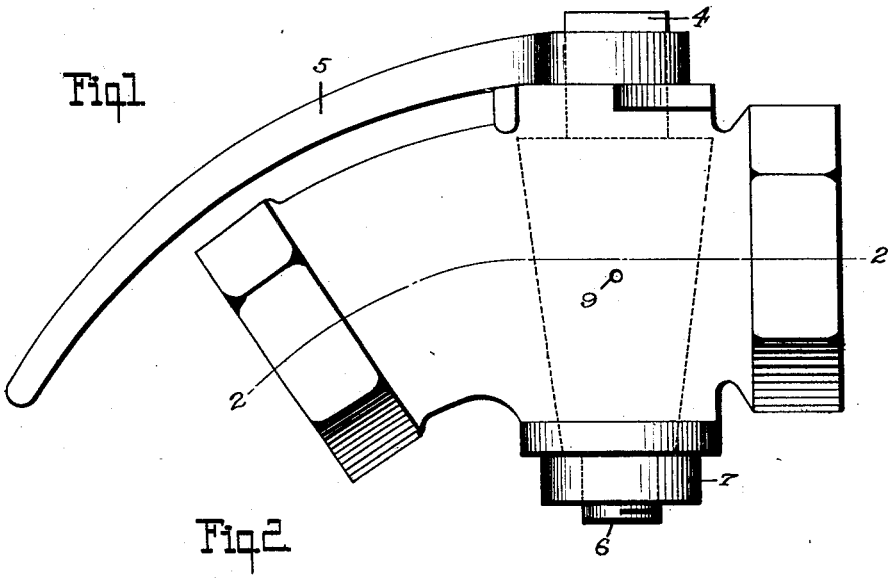
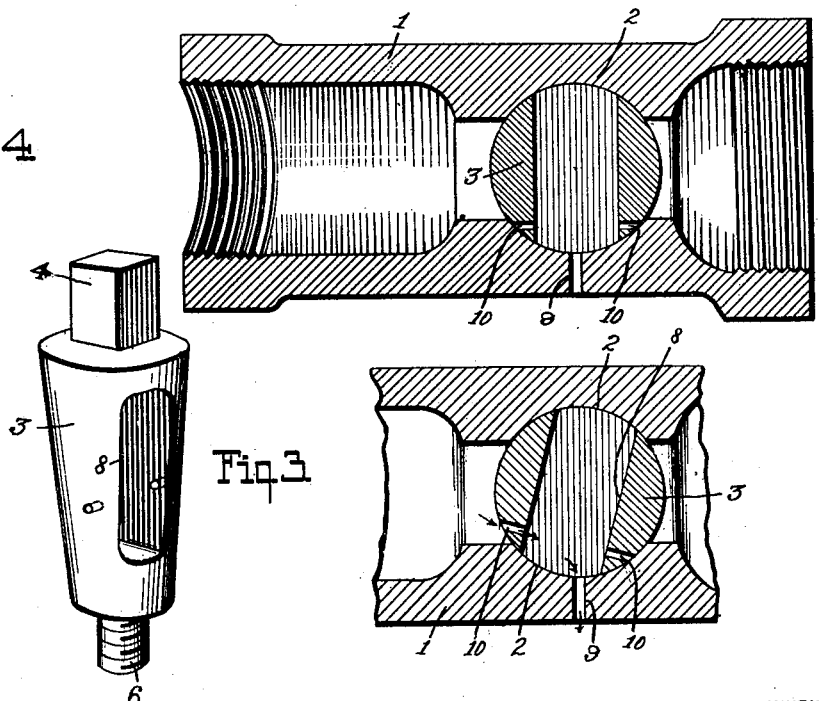
WITNESSES
EABuchanan.
C.E. Trainor.
INVENTOR
H. Migues,
BY
ATTORNEYS

UNITED STATES PATENT OFFICE.

HONORE MIGUES, OF LA FAYETTE, LOUISIANA.

VALVE.

1,371,638.

Specification of Letters Patent.  Patented Mar. 15, 1921.

Application filed November 12, 1919. Serial No. 337,564.

*To all whom it may concern:*

Be it known that I, HONORE MIGUES, a citizen of the United States, and a resident of La Fayette, in the parish of Lafayette and State of Louisiana, have invented certain new and useful Improvements in Valves, of which the following is a specification.

My invention is an improvement in valves, and has for its object to provide mechanism in connection with the angle valves of air brake systems, for automatically setting the brakes behind the valve, when said valves are closed or partly closed, giving the engineer full control of the brakes above the said valve, and for relieving the pressure in the air hose when the cars are cut off, both valves being closed, thus permitting the train-man to break the connection between the air hose with ease.

A further object is to provide a valve which will call the attention of those interested to the fact that it is closed, thus preventing a closed valve from being overlooked.

In the drawings:

Figure 1 is a side view of the improved valve,

Fig. 2 is a section on the line 2—2 of Fig. 1,

Fig. 3 is a view of a portion of Fig. 2 showing the plug in a different position, Fig. 4 is a perspective view of the plug.

In the present embodiment of the invention, the valve casing 1 of usual form, has extending vertically therethrough the tapering passage 2 circular in cross section, for receiving the plug 3. This plug as shown has its upper end reduced and squared as shown at 4 for engagement by the handle 5, and the lower end is reduced and threaded as shown at 6, for engagement by a nut 7 to prevent displacement of the plug or valve.

The valve or plug has a longitudinally extending diametrical opening or passage 8 which is adapted to register with the passage through the casing for permitting the flow of pressure when said passages are turned into register with each other.

I provide in the casing 1 at the passage 2 a port or passage 9, which when the valve is closed will register with the passage 8. I also provide ports or openings 10 in the plug, leading from the passage 8 laterally, and at that side of the plug adjacent to the port 9.

When the valve is partly closed as shown in Fig. 3, with that port 10 uncovered which is adjacent to the hose, it will be evident that pressure in the hose will be relieved, even if the valve of the other hose is entirely closed, so that the passage 10 is not uncovered, as shown in Fig. 2.

If that port 10 is uncovered which is remote from the hose, there will be escape of pressure through the ports 9 and 10, which will notify the inspector that the valve is not in proper shape.

When the train line is charged from the engine to the rear of the train, should any valve in the train be closed or partly closed, the plugs will automatically apply behind said valve, giving the engineer full control of the brakes on the cars ahead. When cars are to be set out, when hose connections are to be broken, and the valves are arranged as shown in Fig. 3 on either side of the valve, the pressure at the joint will be relaxed.

I claim:

A valve of the character described comprising a casing and a plug mounted to rotate therein and having a port registering with the bore of the casing, said casing having in one side a vent opening at right angles to the bore with which the port of the valve registers when the valve is closed, and the valve having passages communicating with the port at opposite sides and near one end thereof and arranged to be covered when the valve is completely closed, and either being uncovered when the valve is in nearly closed position whereby to establish communication between the bore at one side of the plug and the vent opening.

HONORE MIGUES.